UNITED STATES PATENT OFFICE.

CHARLES F. CARPENTER, OF LOUISVILLE, KENTUCKY.

IMPROVED METHOD OF EXTRACTING GOLD AND SILVER FROM ORES.

Specification forming part of Letters Patent No. 53,569, dated April 3, 1866.

*To all whom it may concern:*

Be it known that I, CHAS. F. CARPENTER, of the city of Louisville, in the county of Jefferson, State of Kentucky, have invented a new and Improved Mode of Operating upon Ores Containing Gold and Silver; and I do hereby declare that the following is a full and exact description thereof.

The nature of my invention consists in causing a separation between gold and silver and the baser metals or their ores by means of atmospheric air, causing the atmospheric air to act upon said ores by introducing it into a reverberating furnace between the flame of the furnace and the ores containing gold or silver, which are spread upon the hearth of the furnace.

To enable others skilled in the art to use my invention, I will proceed to describe its operation.

The atmospheric air is introduced into the reverberating furnace through the fire-bridge, (a low wall which separates the fire-place from the hearth,) and consequently will pass over the ores containing gold or silver and beneath the flame of the furnace—that is, the atmospheric air will pass between the ores and the flame of the furnace, the portion which is not decomposed passing off through the chimney. The air, passing over the heated ores, converts the sulphides of the baser metals into the oxides. Neither gold nor silver oxidize in the furnace as the ores of the baser metals do; consequently the gold and silver are easily taken up by amalgamation from their mixture with the oxides of the baser metals, which is not the case when they are associated with the ores of the baser metals in the form of sulphides of copper, iron, &c.

What I claim as my invention, and desire to secure by Letters Patent, is—

The manner of using atmospheric air for the purpose of facilitating the extraction of gold and silver from ores, causing a separation between gold or silver and the ores of baser metals, and consists in introducing the said atmospheric air between the flame of a reverberating furnace and the ores containing gold or silver, which are spread upon the hearth of the furnace.

CHAS. F. CARPENTER.

Witnesses:
C. W. COOK,
L. SLOSS.